(12) United States Patent
Hetherington et al.

(10) Patent No.: US 6,469,713 B2
(45) Date of Patent: *Oct. 22, 2002

(54) METHOD, SYSTEM AND COMPUTER PROGRAM PRODUCT FOR DYNAMIC LANGUAGE SWITCHING VIA MESSAGING

(75) Inventors: David James Hetherington, Austin, TX (US); David Bruce Kumhyr, Fuquay-Varina; Scott A. Will, Wake Forest, both of NC (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/211,801

(22) Filed: Dec. 15, 1998

(65) Prior Publication Data

US 2002/0054097 A1 May 9, 2002

(51) Int. Cl.[7] .................................................. G06F 3/14
(52) U.S. Cl. ........................ 345/740; 345/744; 345/762; 345/765; 345/733; 704/8
(58) Field of Search .............................. 704/8; 345/333, 345/329, 335, 762, 765, 733, 740, 744; 709/203; 707/10

(56) References Cited

U.S. PATENT DOCUMENTS

| 4,730,270 A | 3/1988 | Okajima et al. |
| 4,870,610 A | 9/1989 | Belfer |
| 5,091,876 A | 2/1992 | Kumano et al. |
| 5,127,748 A | 7/1992 | Okimoto et al. |
| 5,136,504 A | 8/1992 | Fushimoto |
| 5,243,519 A | 9/1993 | Andrews et al. |
| 5,251,130 A | 10/1993 | Andrews et al. |

(List continued on next page.)

OTHER PUBLICATIONS

U.S. patent application Ser. No. 09/211,798, Hetherington et al., filed Dec. 15, 1998.
U.S. patent application Ser. No. 09/211,814, Hetherington et al., filed Dec. 15, 1998.
U.S. patent application Ser. No. 09/211,816, Hetherington et al., filed Dec. 15, 1998.

*Primary Examiner*—Crescelle N. dela Torre
*Assistant Examiner*—Thomas T. Nguyen
(74) *Attorney, Agent, or Firm*—Marilyn Smith Dawkins; Bracewell & Patterson, L.L.P.

(57) ABSTRACT

Language, locale, and display change system messages are defined which contain language or locale codes for changing a display language in a user interface. An operating system language or locale property may be altered, or merely the language and/or locale property of a user interface for a specific application or dialog. When received, all subscribers registered as listeners for such language, locale, and display change system messages are notified. The system message may originate from a control dialog or from another application, and may be passed from one application to another or to dialogs associated with the receiving application. User interface dialogs or applications notified of the system message may reload the contents of displays, updating the user interface display to contain the contents of menu labels, help text, or dialog messages in the new human language or display text formatted in accordance with the new cultural convention. The system message thus permits a run-time change of the display language employed for a user interface. This in turn enables remote support by users employing different languages, setting user interface display languages based on user preference, and temporary transactional language switching.

16 Claims, 4 Drawing Sheets

U.S. PATENT DOCUMENTS

| | | | |
|---|---|---|---|
| 5,416,903 A | * | 5/1995 | Malcolm .................... 345/333 |
| 5,499,335 A | | 3/1996 | Silver et al. |
| 5,583,761 A | | 12/1996 | Chou |
| 5,652,884 A | | 7/1997 | Palevich |
| 5,664,206 A | | 9/1997 | Murow et al. |
| 5,671,378 A | | 9/1997 | Acker et al. |
| 5,675,818 A | | 10/1997 | Kennedy |
| 5,678,039 A | | 10/1997 | Hinks et al. |
| 5,721,825 A | * | 2/1998 | Lawson .................... 709/203 |
| 5,734,597 A | | 3/1998 | Molnar et al. |
| 5,745,643 A | | 4/1998 | Mishina |
| 5,754,173 A | | 5/1998 | Hiura et al. |
| 5,802,539 A | | 9/1998 | Daniels et al. |
| 5,812,964 A | | 9/1998 | Finger .......................... 704/7 |
| 5,907,326 A | | 5/1999 | Atkin et al. |
| 5,917,484 A | * | 6/1999 | Mullaney .................... 345/333 |
| 5,974,372 A | * | 10/1999 | Barnes .......................... 704/8 |
| 6,018,344 A | | 1/2000 | Harada et al. |
| 6,073,090 A | | 6/2000 | Fortune et al. |
| 6,185,729 B1 | | 2/2001 | Watanabe et al. |

* cited by examiner

| File | Edit | View |
|---|---|---|
| New    Ctrl-N | | |
| Open   Ctrl-O | | |
| Close | | |

*Fig. 3A*

| データファイル | エディト | ビュー |
|---|---|---|
| 新た | | |
| 開ける | | |
| 引ける | | |

*Fig. 3B*

METHOD, SYSTEM AND COMPUTER PROGRAM PRODUCT FOR DYNAMIC LANGUAGE SWITCHING VIA MESSAGING

RELATED APPLICATIONS

The present invention is related to the subject matter of the following commonly assigned, U.S. patent application: Ser. No. 09/211,798 entitled "METHOD, SYSTEM, AND COMPUTER PROGRAM PRODUCT FOR DYNAMIC LANGUAGE SWITCHING IN USER INTERFACE MENUS, HELP TEXT, AND DIALOGS" and filed Dec. 15, 1998 now U.S. Pat. No. 6,396,315; Ser. No. 09/211,814 entitled "METHOD, SYSTEM, AND COMPUTER PROGRAM PRODUCT FOR DYNAMIC DELIVERY OF HUMAN LANGUAGE TRANSLATIONS DURING SOFTWARE OPERATION" and filed Dec. 15, 1998 now U.S. Pat. No. 6,334,101; and Ser. No. 09/211,816 entitled "METHOD, SYSTEM, AND DATA STRUCTURE FOR SPLITTING LANGUAGE AND LOCALE PROPERTIES IN A DATA PROCESSING SYSTEM" and filed Dec. 15, 1998. The content of the above-referenced applications is incorporated herein by reference, now U.S. Pat. No. 6,339,755.

BACKGROUND OF THE INVENTION

1. Technical Field

The present invention relates in general to user interface display changes and in particular to changing the current display language in a user interface. Still more particularly, the present invention relates to employing system messages to alter a display language in a user interface.

2. Description of the Related Art

Multinational companies often run information system (IS) networks which span multiple regions spread around the globe. To maximize the usefulness of such networks, operations within each region tend to run in the local language of the region. Where possible, names of abstract objects in user applications are in the local language and match the local language organization, city, or human names which the abstract objects represent. In the case of system management software, often abstract objects would represent each of a global enterprise's local offices.

Central management of such a global network may be difficult or impossible when abstract object names utilize the local language and the local language's underlying character set. For offices located in Egypt, abstract objects would most naturally be named in Arabic; offices in Russia would name objects utilizing the Cyrillic character set; and for offices in Japan, objects would be named in Japanese. A problem arises, however, when a enterprise's headquarters IS staff attempts to examine these objects. The IS staff at the multinational headquarters located in the United States is unlikely to be able to read Arabic or Japanese, or even recognize Cyrillic characters.

Japanese, for example, is a logosyllabic or ideographic language which does not have an alphabet representing simple sounds, but instead has a very large character set with symbols ("ideographs") corresponding to concepts and objects rather than simple sounds. For instance, the Joyo Kanji List (Kanji for Daily Use) adopted for the Japanese language in 1981 includes 1945 symbols. Users unfamiliar with the Kanji characters will have difficulty identifying a particular abstract object named in Japanese, as well as difficulty even discussing such abstract objects over the telephone with an English- and Japanese-speaking counterpart.

It would be desirable, therefore, to provide a mechanism for remotely initiating global change of the display language within a user interface. It would further be advantageous for the mechanism to effect global change during run-time operation of a system without requiring the system to be restarted.

SUMMARY OF THE INVENTION

It is therefore one object of the present invention to provide an improved method, system and computer program product for user interface display changes.

It is another object of the present invention to provide a method, system and computer program product for changing the current display language in a user interface.

It is yet another object of the present invention to provide a method, system and computer program product for employing system messages to alter a display language in a user interface.

The foregoing objects are achieved as is now described. Language, locale, and display change system messages are defined which contain language or locale codes for changing a display language in a user interface. An operating system language or locale property may be altered, or merely the language and/or locale property of a user interface for a specific application or dialog. When received, all subscribers registered as listeners for such language, locale, and display change system messages are notified. The system message may originate from a control dialog or from another application, and may be passed from one application to another or to dialogs associated with the receiving application. User interface dialogs or applications notified of the system message may reload the contents of displays, updating the user interface display to contain the contents of menu labels, help text, or dialog messages in the new human language or display text formatted accordance with the new cultural convention. The system message thus permits a run-time change of the display language employed for a user interface. This in turn enables remote support by users employing different languages, setting user interface display languages based on user preference, and temporary transactional language switching.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 3A–3B depict pictorial representations of a user interface human language change initiated by a system message in accordance with a preferred embodiment of the present invention.

DETAILED DESCRIPTION OF THE PREFERRED EMBODIMENT

Figure 1:
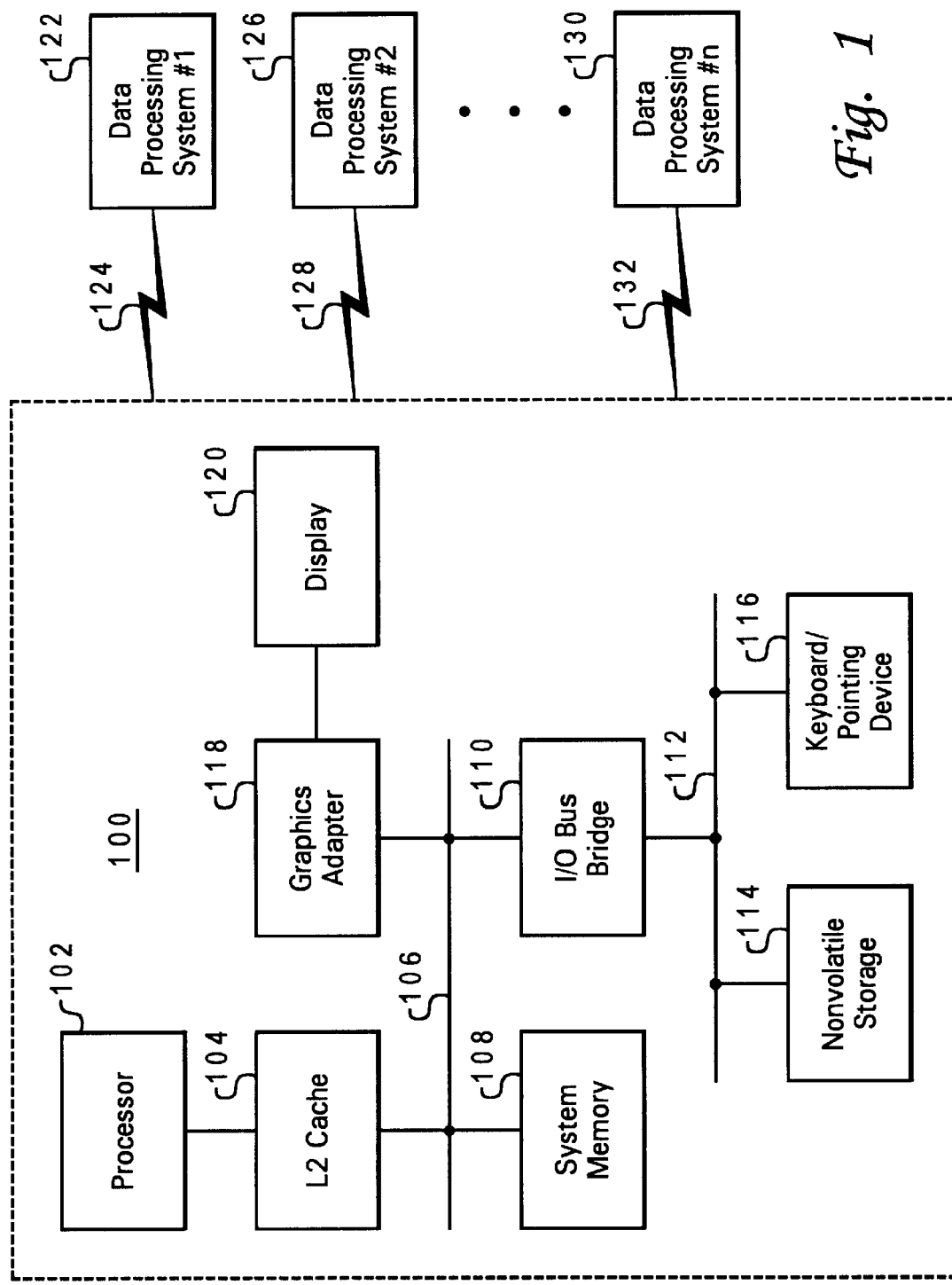
FIG. 1 depicts a block diagram of a data processing system network in which a preferred embodiment of the present invention may be implemented.

With reference now to the figures, and in particular with reference to FIG. 1, a block diagram of a data processing system network in which a preferred embodiment of the present invention may be implemented is depicted. The data processing system network depicted includes a data processing system 100, which may be, for example, one of the Aptiva® models of personal computers available from International Business Machines Corporation of Armonk, N.Y. Data processing system 100 includes a processor 102, which in the exemplary embodiment is connected to a level two (L2) cache 104, which is connected in turn to a system bus 106. In the exemplary embodiment, data processing system 100 includes graphics adapter 118 connected to system bus 106, receiving user interface information for display 120.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or the like, are connected to I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention.

Data processing system 100 is coupled to data processing system 122 via communications link 124, to data processing system 126 via communications link 128, and to data processing system 130 via communications link 132. Data processing systems 122, 126, and 130 may exchange data including human language text such as files or system messages with data processing system 100.

The data processing system network which is depicted and the implementation examples below are provided solely as examples for the purposes of explanation and are not intended to imply architectural limitations. Those skilled in the art will recognize the numerous programming languages which may be utilized, all of which are believed to be embraced within the spirit and scope of the invention.

Figure 2:
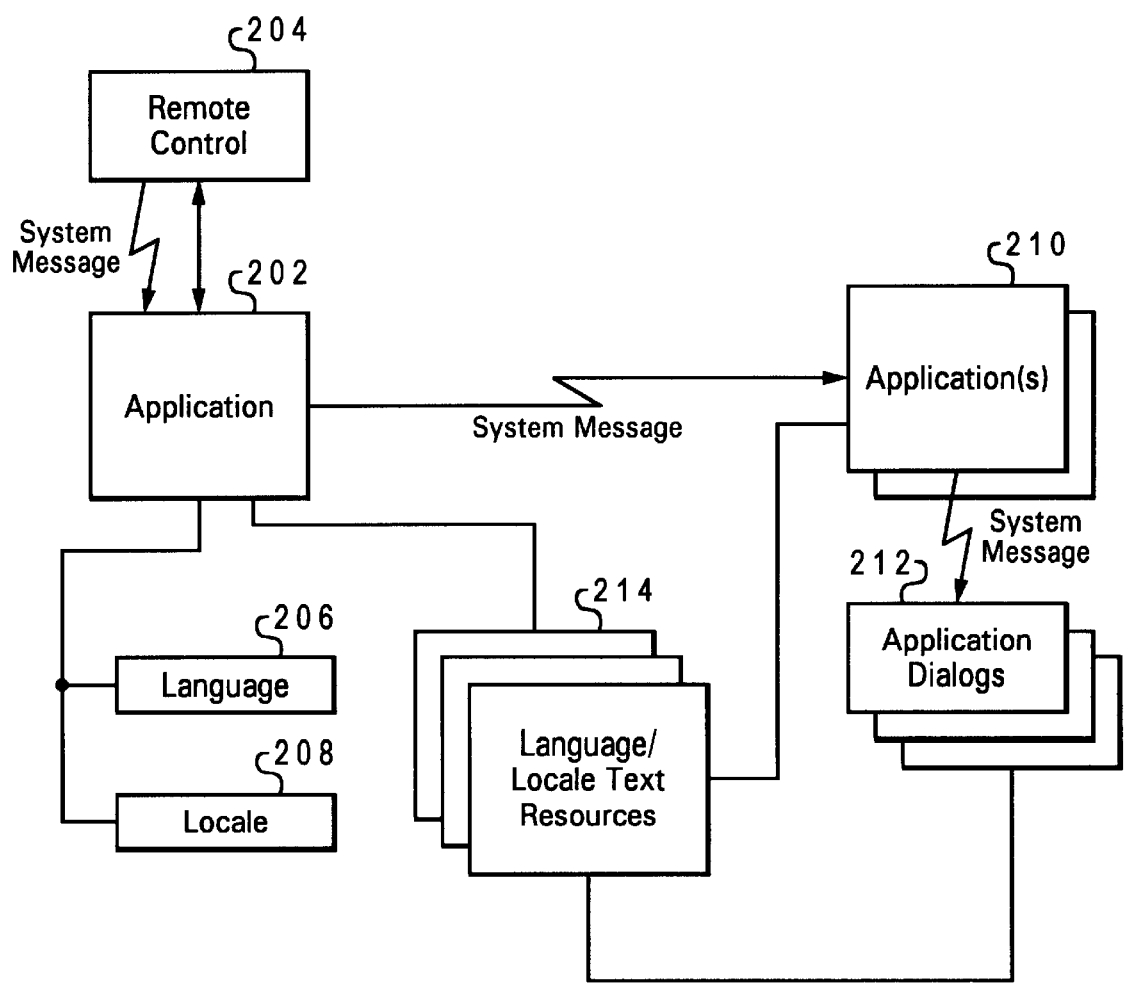
FIG. 2 is a functional block diagram of employing system messages to effect language changes within a user interface in accordance with a preferred embodiment of the present invention.

Referring to FIG. 2, a functional block diagram of employing system messages to effect language changes within a user interface in accordance with a preferred embodiment of the present invention is depicted. An application 202 executing on a data processing system may communicate with a remote control 204. During operating, application 202 generates a user interface including human language text, which is displayed on the display of the local data processing system.

Remote control 204 be located within a separate data processing system and may remotely load and/or control the execution of application 202. Application 202 may include functionality for serving requests from remote control 204, such as requests for retrieving the user interface display of application 202 for display within the display of the second data processing system. Thus, remote control 204 may enable a user to operate application 202 executing on a local system from a remote system.

Application 202 is configured to receive and act upon system messages. System messages may be employed in the present invention to change a language or locale property setting for a user interface display. Such system messages preferably include a language code, which may be a lowercase, two letter ISO Language Code defined by ISO-639, and/or a locale code, which may be an upper-case, two letter ISO Country Code defined by ISO-3166.

Various system messages are defined which contain the language and/or locale code, such as a language change message, a locale change message, or a display change message. Language and locale change messages may alter the language and locale property settings for the user interface and within the underlying system (e.g., language property 206 and/or locale property 208), while a display change message may simply alter the language and/or locale (separately or jointly) within the user interface without altering the underlying system language and locale properties 206 and 208.

Enabled subscribers for language/locale system messages may react differently to system messages changing language and locale properties 206 and 208 than to display change messages. Language and locale change messages may effect global change in all application and operating system user interfaces of the human language employed for user interface text and the cultural conventions employed for locale-specific formatting. Display change messages, however, may only effect the user interface for a single application without any alteration of other application or operating system user interfaces.

The language, locale, and display change system message(s) may be initiated either by a user through a dialog for altering the system language or locale properties, or a dialog for altering the display language or locale properties. The language, locale, and display change system message(s) may also be initiated by an application sending an appropriate system message. The system message may thus originate from a user operating remote control 204. However, application 202 may also originate a system message—either in response to a system message from remote control 204 or independently—for other applications 210. Applications 210 may similarly forward system messages to user interface dialogs 212 for appropriately altering any user interface text within such dialogs. Each application, operating system component, or dialog is preferably configured to receive (and also possibly to send) language, locale, or display change system messages, and may be registered as subscribers or "listeners" for such system messages with other applications or operating system components.

Applications 202 and 210 and dialogs 212 which are configured to change upon receiving a language, locale, or display change message may reload and/or reformat human language text strings or character strings within the user interface based on language/locale text resources 214. Resources 214 may comprise, for example, substitute or interchangeable menu labels, help text, and dialog messages in different human languages for each user interface of applications 202 and 210 and dialogs 212. User interface display controls for each user interface of applications 202 and 210 and dialogs 212 may also include display formatting methods which are responsive to locale or display change system message.

For example, if a user interface display for a calendaring application contains the text "January" and a language change system message is received changing the language from English (en) to Hebrew (iw), the display control may reload the display field with the text "■ ׳ שׁרׅ תָ■". The text for that display field would be defined in both languages within resources 214. If a display change system message were received under the same circumstances changing the language from English (en) to Hebrew (iw) and the locale from United States (US) to Israel (IW), the format of characters shown within the display field may also be altered to display "■ תשׁ ר ■", to match the right-to-left cultural convention predominant in Israeli Hebrew text.

When a new language and/or locale is selected, all enabled subscribers for language/locale system messages may choose to react to the message by reloading human language user interface text and reformatting locale specific data. The language, locale, and display change messages may cause some application user interfaces or dialogs to change without prompting changes in others. That is, some user interfaces or dialogs may exhibit no behavior change for a change of language, but alter a display for a change of locale. For example, a numeric date display would change its presentation format depending on the locale selected (e.g., from U.S. to European), but the digits would not change. Other objects will have behavior changes for both language and locale, as in a text date display which changes both the presentation format and the textual month name and weekday name.

System message based display changes enable run time switching of the display language and behavior of any application which implements a listener to suit the user's language needs and cultural preferences. Users may thus change language as needed independently of both operating system and locale, with objects responding logically. For instance, a user may elect to view data displayed in Italian even though operating on a system installed as US English and running in a US locale. After initiating the appropriate system messages, the user would then view data in Italian language and data formatting. A user may select a different language in mid-transaction to view a display in a language with which the user is more comfortable.

System message based display changes also permit remote support. A user on one data processing system operating, for instance, in New York may receive user interface displays and controls transmitted from another data processing system operating in, say, Moscow. The display transmitted from Moscow to the troubleshooter's local system in New York may be switched by system messages to display English instead of Russian, allowing the troubleshooter to recognize the object names displayed. A system message may be transmitted between the systems to "flip" the remote display, and accordingly the user interface display received at the remote system in New York. Alternatively, only the New York user interface display may be flipped by transmitting a system message to the application which receives and processes the user interface display from the Moscow system.

The message-based display change mechanism additionally allows a user's language preference to be saved and restored so that language automatically changes when the user or operator changes. Message-based changing also permits one application to "flip" the display of other applications to a language or locale setting necessary for the applications to interact meaningfully. For instance, an Internet commercial transaction may force a local accounting application to switch to a particular language and locale to complete a transaction, with the accounting application reverting back to the default language and locale (with appropriate conversion of dates, currencies, etc.) upon completion of the transaction.

Referring to FIGS. 3A and 3B, pictorial representations of a user interface human language change initiated by a system message in accordance with a preferred embodiment of the present invention are depicted. FIG. 3A illustrates a portion of a user interface containing user interface text prior to receipt of a language change system message by an underlying application. Text displayed within the user interface is displayed in a first human language, English in the depicted example.

FIG. 3B illustrates the same portion of the user interface after receipt of a language change system message. The user interface is dynamically altered as a result of receiving the system message—that is, changed without shutting down and/or rebooting a system. Text displayed within the user interface is now displayed in a second human language, Japanese in the example shown.

Figure 4:
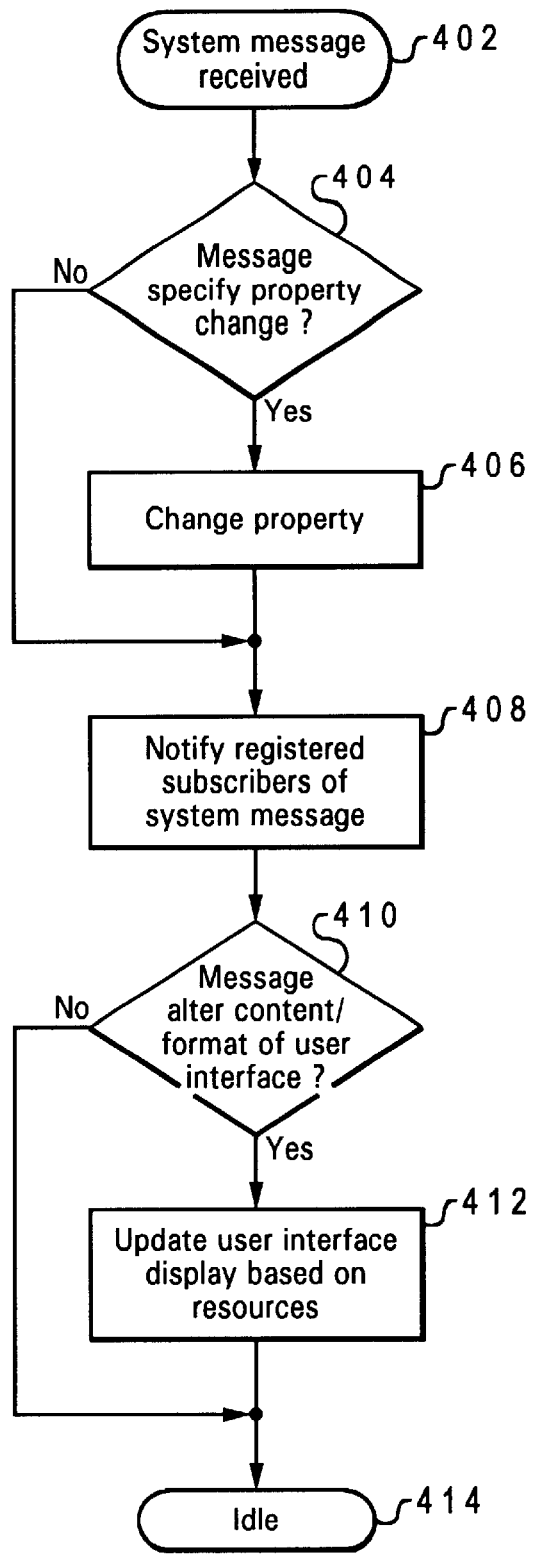
FIG. 4 is a high level flowchart for a process of employing system messages to effect language changes within a user interface in accordance with a preferred embodiment of the present invention.

Referring to FIG. 4, a high level flowchart for a process of employing system messages to effect language changes within a user interface in accordance with a preferred embodiment of the present invention is illustrated. The process begins at step 402, which depicts receiving a language, locale, or display change system message. The system message received may originate locally on a local host system or from a remote system.

The process then passes to step 404, which illustrates a determination of whether the received system message requires that an operating system language or locale property be changed. If so, the process proceeds first to step 406, which depicts changing the property according to the received system message, and then to step 408. If not, however, the process proceeds instead directly to step 408, which illustrates notifying all subscribers registered as listeners for language, locale or display change system messages of the received system message.

The process next passes to step 410, which depicts a determination of whether the user interface content or format requires alteration to conform to the received system message. If so, the process proceeds first to step 412, which illustrates reloading the user interface as required by the received system message based on available resources for the new language/locale for the user interface, and then to step 414. If not, the process proceeds instead directly to step 414, which depicts the process becoming idle until a language, locale, or display change system message is again received.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of altering a display at a remotely located subscriber system, comprising:

receiving a language, locale, or display change system message from a host system containing a code including a human language code, a locale code, or both at a subscriber system coupled to said host system and registered for language, locale, or display change system messages of the received system message;

comparing the code within the system message to a current code defining a human language or a locale property within an operating system, application or dialog within said registered subscriber system;

responsive to determining that the code within the system message differs from the current code for an operating system, application or dialog within said registered subscriber system, dynamically altering a user interface display human language within said registered subscriber system, if necessary, to conform to a display property matching the language property or the locale property defined by the human language code within the system message without changing an operating system language property; and changing a user interface display locale property within said registered subscriber system to match the received locale property code without changing an operating system locale property.

2. The method of claim 1, wherein the step of receiving a language, locale, or display change system message from a host system containing a code including a language code, a locale code, or both further comprises:

receiving a language change system message containing a human language code.

3. The method of claim 2, further comprising:

responsive to receiving the language change system message, changing an operating system human language within said registered subscriber system to match the received human language code.

4. The method of claim 1, wherein the step of receiving a language, locale, or display change system message from a host system containing a code including a human language code, a locale code, or both further comprises:

receiving a locale change system message containing a locale code.

5. The method of claim 4, further comprising:

responsive to receiving the locale change system message, changing an operating system locale property to match the received locale code.

6. The method of claim 1, wherein the step of receiving a language, locale, or display change system message from a host system containing a code including a human language code, a locale code, or both further comprises:

receiving a display change system message containing a human language code and a locale code.

7. The method of claim 1, wherein the step of dynamically altering a user interface within said registered subscriber system, if necessary, to conform to a display property matching the human language or the locale property defined by the code within the system message further comprises:

switching a user interface human language for text strings displayed within the user interface to a different human language specified by the received code within the system message.

8. The method of claim 1, wherein the step of dynamically altering a user interface within said registered subscriber system, if necessary, to conform to a display property matching the human language or the locale property defined by the code within the system message further comprises:

switching a user interface format for character strings displayed within the user interface to a different cultural format specified by the received code within the system message.

9. A computer program product within a computer usable medium for altering a display at a remotely located subscriber system, comprising:

instructions for receiving a language, locale, or display change system message from a host system containing a code including a human language code, a locale code or both;

instructions for notifying a subscriber system registered for language, locale, or display change system messages of the received system message;

instructions for comparing the code within the system message to a current code defining a human language or a locale property within an operating system, application or dialog within said registered subscriber system;

instructions, responsive to determining that the code within the system message differs from the current code for an operating system, application or dialog, for dynamically altering a user interface display human language within said registered subscriber system, if necessary, to conform to a display property matching the language property or the locale property defined by the human language code within the system message, without changing an operating system language property; and changing a user interface display locale property to match the received locale property code without changing an operating system locale property.

10. The computer program product of claim 9, wherein the instructions for receiving a language, locale, or display change system message from a host system containing a code including a language code, a locate code, or both further comprises:

instructions for receiving a language change system message containing a human language code.

11. The computer program product of claim 10, further comprising:

instructions, responsive to receiving the language change system message from a host system, for changing an operating system human language within said registered subscriber system to match the received human language code.

12. The computer program product of claim 9, wherein the instructions for receiving a language, locale, or display change system message containing a code including a human language code, a locale code, or both further comprise:

instructions for receiving a locale change system message containing a locale code.

13. The computer program product of claim 12, further comprising:

instructions, responsive to receiving the locale change system message from a host system, for changing an operating system locale property to match the received locale code.

14. The computer program product of claim 9, wherein the instructions for receiving a language, locale, or display change system message from a host system containing a code including a human language code, a locale code, or both further comprise:

instructions for receiving a display change system message containing a human language code and a locale code.

15. The computer program product of claim 9, wherein the instructions for dynamically altering a user interface, if necessary, to conform to a display property matching the human language or the locale property defined by the code within the system message further comprise:

instructions for switching a user interface human language for text strings displayed within the user interface to a different human language specified by the received code within the system message from a host system.

16. The computer program product of claim 9, wherein the instructions for dynamically altering a user interface, if necessary, to conform to a display property matching the human language or the locale property defined by the code within the system message further comprise:

instructions for switching a user interface format for character strings displayed within the user interface to a different cultural format specified by the received code within the system message.

\* \* \* \* \*